(12) United States Patent
Potthast et al.

(10) Patent No.: US 9,421,629 B2
(45) Date of Patent: Aug. 23, 2016

(54) METHOD OF PRODUCING A MATERIAL JOINT, AND HOLLOW SECTION CONNECTION

(75) Inventors: Simon Potthast, Paderborn (DE); Siegfried Fecke, Salzkotten (DE)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 710 days.

(21) Appl. No.: 13/187,895

(22) Filed: Jul. 21, 2011

(65) Prior Publication Data

US 2012/0018406 A1 Jan. 26, 2012

(30) Foreign Application Priority Data

Jul. 21, 2010 (DE) .................. 10 2010 031 890

(51) Int. Cl.
| | |
|---|---|
| B23K 31/02 | (2006.01) |
| B23K 9/028 | (2006.01) |
| B23K 9/23 | (2006.01) |
| B23K 33/00 | (2006.01) |
| F16L 13/007 | (2006.01) |
| F16L 13/02 | (2006.01) |

(52) U.S. Cl.
CPC .............. *B23K 9/0286* (2013.01); *B23K 9/232* (2013.01); *B23K 33/006* (2013.01); *F16L 13/007* (2013.01); *F16L 13/0236* (2013.01); *B23K 2201/006* (2013.01); *B23K 2201/06* (2013.01); *B23K 2203/20* (2013.01)

(58) Field of Classification Search
CPC ............. B23K 9/00; B23K 1/20; B23K 31/02
USPC ................... 219/75, 78.01, 59.1, 61
See application file for complete search history.

(56) References Cited

U.S. PATENT DOCUMENTS

| | | | | |
|---|---|---|---|---|
| 3,171,944 A | * | 3/1965 | Linnander ................. | 219/137 R |
| 3,634,650 A | * | 1/1972 | Nomura .................... | 219/137 R |
| 3,670,140 A | * | 6/1972 | Roberts .................... | 219/137 R |
| 3,832,523 A | * | 8/1974 | Kitani et al. ............. | 219/137 R |
| 4,020,312 A | * | 4/1977 | Araki et al. ............... | 219/61 |
| 4,104,499 A | * | 8/1978 | Luttrell .................. | B23K 9/028 |
| | | | | 219/125.11 |
| 4,258,247 A | * | 3/1981 | Shimada et al. .......... | 219/137 R |
| 4,296,308 A | * | 10/1981 | Nakahama ............. | B23K 9/028 |
| | | | | 219/125.1 |
| 4,362,919 A | * | 12/1982 | Miller et al. ............... | 219/137 R |
| 4,935,597 A | * | 6/1990 | Zimmer .................... | 219/124.34 |
| 6,109,662 A | * | 8/2000 | van Zuthem et al. ...... | 285/146.2 |
| 8,002,167 B2 | * | 8/2011 | Zuber et al. ................ | 228/135 |

(Continued)

FOREIGN PATENT DOCUMENTS

| | | | | |
|---|---|---|---|---|
| JP | 55075883 A | * | 6/1980 | |
| JP | 2006 159 253 A | | 6/2006 | |

*Primary Examiner* — Dana Ross
*Assistant Examiner* — Ayub Maye
(74) *Attorney, Agent, or Firm* — Henry M. Feiereisen LLC (57) ABSTRACT

In a method of producing a material joint between a hollow section of steel and a structural element of an aluminum material, hollow section is aligned in relation to the structural element in a coupling position. One end of the hollow section is placed upon a shoulder of the structural element, and the end of the hollow section is connected with the structural element by thermal joining, using inert gas shielded arc welding. A welding torch is hereby positioned at an angle of 20° to 40° in relation to an axial direction in a welding position in relation to a joining seam to be realized, and the axial direction is oriented in parallel relationship to a longitudinal axis of the hollow section.

23 Claims, 5 Drawing Sheets

(56) References Cited

U.S. PATENT DOCUMENTS

| | | | |
|---|---|---|---|
| 8,729,424 B2 * | 5/2014 | Lin | 219/121.64 |
| 2002/0179583 A1 * | 12/2002 | Copeland et al. | 219/137 WM |
| 2008/0011727 A1 * | 1/2008 | Peters | 219/130.5 |
| 2008/0230527 A1 * | 9/2008 | Cai | B23K 9/0026 219/137 R |
| 2009/0152865 A1 * | 6/2009 | Zuber et al. | 285/288.11 |
| 2010/0176108 A1 * | 7/2010 | Nakajima et al. | 219/137 R |

\* cited by examiner

METHOD OF PRODUCING A MATERIAL JOINT, AND HOLLOW SECTION CONNECTION

CROSS-REFERENCES TO RELATED APPLICATIONS

This application claims the priority of German Patent Application, Serial No. 10 2010 031 890.6, filed Jul. 21, 2010, pursuant to 35 U.S.C. 119(a)-(d), the content of which is incorporated herein by reference in its entirety as if fully set forth herein.

BACKGROUND OF THE INVENTION

The present invention relates, in general, to a method of producing a material joint.

The following discussion of related art is provided to assist the reader in understanding the advantages of the invention, and is not to be construed as an admission that this related art is prior art to this invention.

The provision of steel-aluminum hybrid parts has a great potential to reduce weight and improves product properties in particular in the field of aviation and space travel as well as in the field of automotive engineering. Structural parts of steel and aluminum material are normally connected using non-thermal joining processes, such as, e.g., riveting or bolting. The various structural parts are hereby connected by a formfit of the rivet or bolt. The strength of such a connection is however limited because of its point-like force transfer. In addition, the introduction of a rivet or a bolt is accompanied by a material removal that causes a weakening in the area of the coupling site.

Another approach to connect hybrid parts of different materials involves the presence of an adhesive joint. An adhesive joint oftentimes is however inadequate to attain the necessary accuracy of production or service life. Also the magnitude of forces that can be transmitted by an adhesive joint is greatly restricted. Thus, cold joining processes like for example riveting or bonding are unable to attain the required stability.

The application of welding has also been known to connect steel alloys and aluminum alloys by a material joint. Despite the widely varying melting points of both types of alloy, welding has been used to realize the material joint. An example of a welding process includes solder-welding. The component of aluminum alloy is hereby melted and connected to the component of steel by material joint. The steel component is coated so as to cross-link the weld material with the coating. As a result, the aluminum component undergoes a welding process and the steel component undergoes a soldering process. Joints realized by solder-welding result however only in a limited strength.

It would be desirable and advantageous to provide an improved method of producing a material joint to obviate prior art shortcomings.

SUMMARY OF THE INVENTION

According to one aspect of the present invention, a method of producing a material joint between a hollow section of steel and a structural element of an aluminum material includes the steps of aligning the hollow section in relation to the structural element in a coupling position, placing one end of the hollow section upon a shoulder of the structural element, and thermal joining of the end of the hollow section with the structural element using inert gas shielded arc welding by positioning a welding torch at an angle of 20° to 40° in relation to an axial direction in a welding position in relation to a joining seam to be realized and orienting the axial direction in parallel relationship to a longitudinal axis of the hollow section.

The present invention resolves prior art problems by providing a material joint between a steel component and an aluminum component in the absence of any additional coating processes, in particular for the steel component. The inert gas shielded arc welding may be executed as a continuous welding process or also in several stages. It is for example also conceivable to carry out the welding process with several welding layers. By positioning the welding torch in the welding position in accordance with the present invention, the horizontal welding of butt welds and/or fillet welds in a weld pool position is implemented. Arranging the welding torch at an angle of 20° to 40° in relation to the longitudinal axis of the components being connected relative to a joining seam to be produced results in a most beneficial heat introduction so that the hybrid connection realizes a material joint without cumbersome coating processes of the steel component, thus saving costs while at the same time increasing production accuracy. This is true especially in the case of zinc coatings which are normally applied for steel components and require further protective measures for workers in the form of suction plants and splash guards at production sites.

According to another advantageous feature of the present invention, the inert gas may include as constituents argon and helium. Currently preferred is a composition of 70 wt-% of argon and 30 wt-% of helium. The provision of such an inert gas composition has a positive effect on the material joint being produced because the melting aluminum welding material is hindered from igniting and/or splashing, again resulting in a most beneficial heat introduction especially into the steel component. Overall, a joining zone is realized that has little trapped air and a reliable weld seam.

According to another advantageous feature of the present invention, the welding torch can be fixed while the hollow section and the structural element can move in relation to the welding torch. Advantageously, a piercing advance of welding wire is carried out. Using a stationary welding torch results in a reliable high-quality joining seam. As a result of the fixed welding torch and a welding zone that is movable relative thereto during the production process, the production accuracy is enhanced and positively affects the welded connection to be produced. The application of piercing welding, i.e. the torch tracks the arc, is advantageous, with a piercing effected in the joining zone. This also positively affects heat introduction by the torch into the joining zone to be produced.

According to another advantageous feature of the present invention, the welding torch can be aligned radially outwards at an angle of 20° to 50° relative to the longitudinal axis of the joining seam to be realized, in addition to the positioning of the welding torch in the welding position at an angle of 20° to 40° in relation to the longitudinal axis in advance direction of the welding torch. As a result, the welding torch is positioned at an angle of 20° to 40° relative to the welding direction and thus in tangential direction, and at an angle of 20° to 50° orthogonal to the welding direction outwards and thus in radial direction.

According to another advantageous feature of the present invention, the inert gas shielded arc welding can be executed at a weld speed between 9 and 16 mm/s. The weld speed is the speed with which the welding torch can be moved across the joining zone to be produced or, in accordance with the present invention the speed with which the joining zone can be moved in relation to the welding torch. Advantageously, the thermal joining step may include the addition of a weld metal at a wire advance speed in a range between 7 and 10 m/min. This is applicable in particular when the wire diameter ranges between 1 and 1.6 mm, especially 1.2 mm. Advantageously, the weld metal may be made of an aluminum alloy.

According to another advantageous feature of the present invention, the thermal joining step may involve a pulsed MIG (metal inert gas) welding process.

According to another advantageous feature of the present invention, the thermal joining step results in a material joint between the structural element and the hollow section, and is supplemented by a formfit. The formfit is produced by the added weld material or weld metal between the structural element and the hollow section. The strength of the material joint is therefore further increased by the formfit.

According to another advantageous feature of the present invention, the structural element of aluminum can be configured as a cast body or milled body, with the structural element being machined before being pressed in a reception zone for the hollow section. This results in a precise fit of the hollow section being pressed onto the structural element of aluminum. In addition, manufacturing tolerances can be minimized.

According to another advantageous feature of the present invention, the structural element of aluminum may include a receiving pin onto which the hollow section can be pressed to thereby provide a press-fit between the receiving pin of the structural element and the hollow section and an interference fit between these two components. This interference fit complements the material joint, and in the presence of an additional formfit complements the combined connection between the components by material joint and formfit. This further enhances the strength of the hybrid connection.

According to another advantageous feature of the present invention, the receiving pin may have a beveled free end at a chamfer angle in a range between 20° and 60°, and a reception zone at a length between 8 mm and 60 mm along which the hollow section is pressed onto the receiving pin. The presence of the bevel enables a particularly simple joining of the two components by centering the hollow section at the start of the pressing process through the bevel so that the hollow section can easily be pressed upon the receiving pin in the initial region.

By selecting the length and shape of the receiving pin, the strength of the interference fit can be influenced by increasing the length of the receiving pin to create a strong interference fit. The bevel may also be defined by a radius or configured in the form of a cup or tulip-like shape.

According to another advantageous feature of the present invention, the structural element can have a depression in the shape of a trough to extend about the receiving pin for receiving a formed region of the hollow section, with the depression having a curvature on both sides of a bottom zone. Currently preferred is a radius of the curvature between 1 and 18 mm. The presence of the trough-shaped depression in combination with a formed region of the hollow profile allows a joining of both components by formfit as well a material joint using welding. The trough-shaped depression is hereby used for receiving the weld material on the outer side and for receiving the formed region of the hollow section on the inner side in relation to the receiving pin. Weld material which is connected on the outer side by a material joint with the structural element thus forms an undercut for the formed region of the hollow section. This results in the formfitting connection which leads to a particularly high strength against static and dynamic tensile load, bending load and torsional load.

According to another advantageous feature of the present invention, the trough-shaped depression can be delimited by the receiving pin on an inner side and by a receiving bead on an outer side. Suitably, the receiving bead is defined by a height between 3 mm and 10 mm and extends on the side proximal to the receiving pin at an angle in relation to the longitudinal axis of the receiving pin. Currently preferred is an angle between 20° and 60°. The afore-described properties of the receiving bead provide optimal properties to receive weld material and weld metal, when thermal joining is involved.

According to another advantageous feature of the present invention, the hollow section may be formed and/or calibrated before being pressed with the end upon the receiving pin. Forming involves advantageously a widening of the end to be pressed to form a collar. The hollow section may have a wide range of cross sections in the joining zone. Currently preferred is a round configuration of the hollow section, although non-circular configurations such as elliptic or angled cross sections may, of course, also be possible. Forming thus can be best suited to the respective type of hollow section. The type of hollow section is determinative for a calibration and orientation of the hollow section upon the structural element by having the inner contour of the hollow section in combination with the receiving pin align the hollow section and the structural element relative to one another. The hollow section and the receiving pin may be configured tetragonal or polygonal.

According to another advantageous feature of the present invention, the end of the hollow section may have an inner side which is defined by a radius in correspondence with a radius of trough-shaped depression on the inner side. Thus, there is no gap between the structural element and the hollow section as a result of the press-fit between the hollow section and the structural element. As a result, ambient air is prevented from migrating into the melt during thermal joining and thus is prevented from adversely affecting the welding outcome. Also prevented is ingress of moisture from ambient air into the realized press-fit so that no crevice corrosion can occur. Overall, strength and service life of the produced joint is enhanced.

The hollow section may also be attached to the receiving pin by compressive deformation. In this way, no mechanical after-finishing of the hollow section ends is necessary.

According to another advantageous feature of the present invention, the outer side of the hollow section at the formed end of the hollow section can be deburred. During thermal joining, the deburred end minimizes the presence of a gap between hollow section and structural part. This also leads to an improvement of the strength and life of the realized connection.

According to another advantageous feature of the present invention, the thermal joining step may be carried out in one layer or in several layers. By using a multilayered approach of the joining process, it is possible to best suit the demands of the joint. The strength is increased and the thermal influence in the welding zone is slight. When multilayered welding is involved, there is no need to use much weld material in one step. The weld metal may be applied in several layers. Advantageously, mechanical, physical and/or chemical cleaning of the weld seam may be applied during application of individual layers. Such a cleaning can be realized for example by dry ice blasting. The cleaned weld seam enhances the joint and improves the welding outcome for the weld seam to be subsequently applied, when compared to untreated weld seam.

According to another aspect of the present invention, a hollow section is connected to a structural element of an aluminum material, with the hollow section being made of steel and having an end pressed onto the structural element and connected to the structural element by thermal joining to realize a material joint and an interference fit. The hollow section is pressed onto the structural element and additionally thermally joined therewith. This connection may be supplemented by a formfit depending on the involved geometry.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 1:
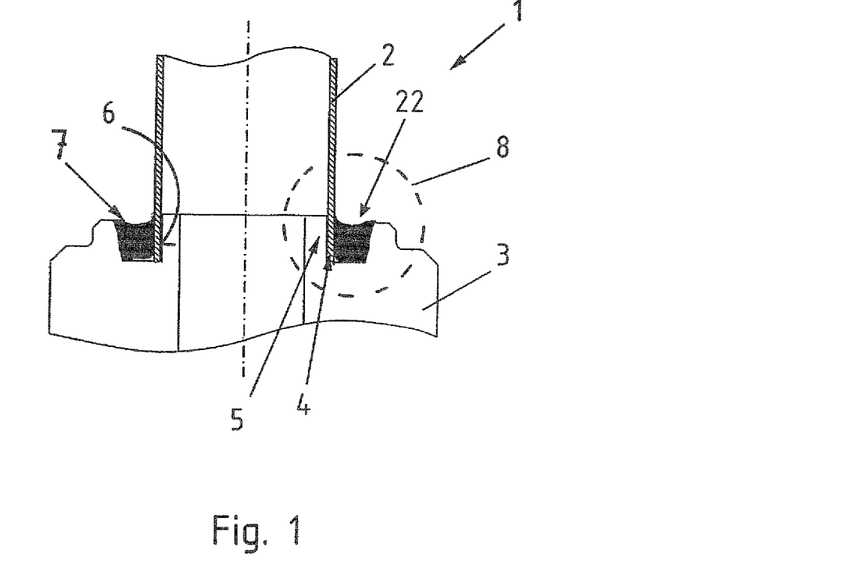
FIG. 1 is a cross sectional view of one embodiment of a hybrid part produced in accordance with a method according to the present invention.

Turning now to the drawing, and in particular to FIG. 1, there is shown a cross sectional view of one embodiment of a hybrid part generally designated by reference numeral 1 and produced in accordance with a method according to the present invention. The hybrid part 1 includes a hollow section 2 of steel and a structural element 3 of an aluminum alloy. The hollow section 2 has one end 4 which faces the structural element 3 and is configured straight and which is placed upon a tubular frustum-shaped shoulder 5 of the structural element 3. A press-fit 6 may also be provided between the tubular frustum-shaped shoulder 5 and the end 4 of the hollow structural element 2. The structural element 3 can be configured as cast aluminum body or milled aluminum body, with the structural element 3 being machined before being pressed in a reception zone 22 for the hollow section 2.

A material joint is provided between the end 4 of the hollow section 2 and the structural element 3 and implemented in a joining zone by a joining seam 7, weld metal, and a welding torch not shown here.

Figure 2:
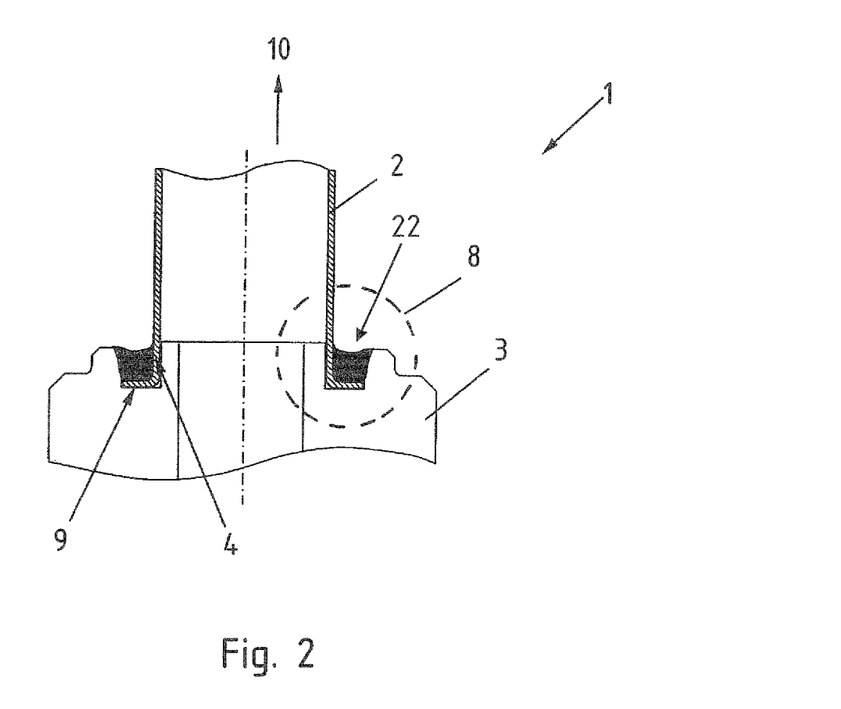
FIG. 2 is a cross sectional view of another embodiment of a hybrid part produced in accordance with a method according to the present invention.

FIG. 2 shows a cross sectional view of another embodiment of hybrid part 1 produced in accordance with a method according to the present invention. Parts corresponding with those in FIG. 1 are denoted by identical reference numerals and not explained again. The hollow section 2 and the structural element 3 of the hybrid part 1 are also connected to one another by a material joint. In this embodiment, the hollow section 2 has an end 4 which however is widened and is bent outwards to form a collar 9. The joining seam 7 thus forms a material joint in the joining zone 8 between structural element 3 and hollow section 2 and in addition a formfitting connection to realize enhanced tensile and compressive strengths in an axial direction 10.

Figure 3:
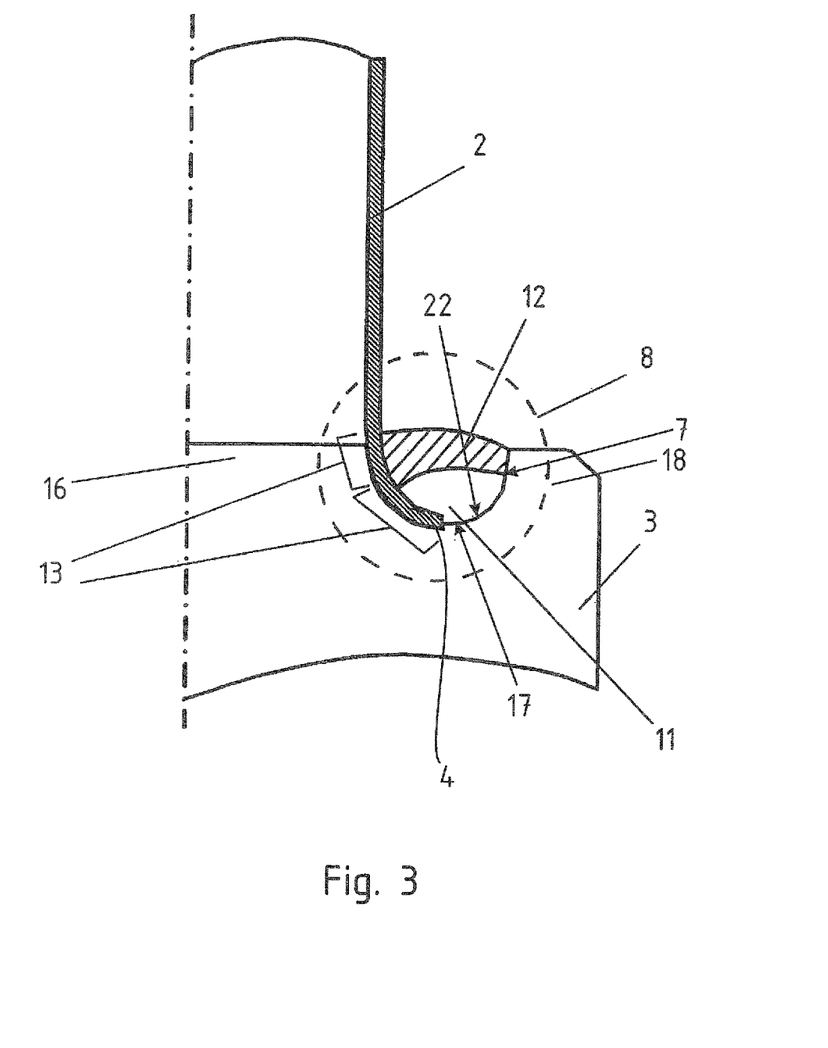
FIG. 3 is a detailed view of a hybrid part produced in accordance with a method according to the present invention and having two welding layers.

FIG. 3 shows a detailed view of a material joint in accordance with the present invention. The material joint is provided between the structural element 3 and the end 4 of the hollow section 2, with the end 4 of the hollow section 2, shown here also widened, and also coupled in a joining zone 8 with the structural element 3 via the joining seam 7. Welding is implemented here in at least two stages. A first welding stage provides a first layer 11, and a second welding stage provides a second layer 12. As a result, there are two zones 13 of different strength properties and different microstructures (not shown).

The structural element 3 has a receiving pin 16 onto which the hollow section 2 is pressed onto to thereby provide an interference fit between the structural element 3 and the hollow section 2. A depression 17 in the shape of a trough is formed by the support element 3 to extend about the receiving pin 16 for receiving a formed region of the hollow section 2, with the depression 17 having a curvature on both sides of a bottom zone. The curvature of the depression 17 has a radius between 1 and 18 mm. As shown in FIG. 3, the depression 17 is delimited by the receiving pin 16 on an inner side and on an outer side by a receiving bead 18 of the support element 3. The receiving bead 18 is hereby defined by a height between 3 mm and 10 mm and extends at a side facing the receiving pin 16 at an angle between 20° and 60° to a longitudinal axis of the receiving pin 16.

Figure 7:
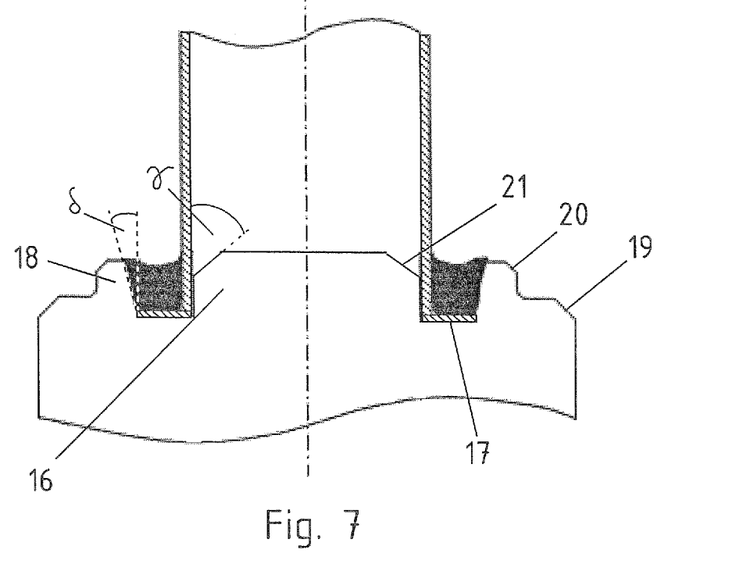
FIG. 7 is a cross sectional view of a variation of the hybrid part of FIG. 2.

As shown in particular in FIG. 7, the receiving pin 16 has a beveled free end at a chamfer angle γ in the range between 20° and 60°. The reception zone 22 has a length between 8 mm and 60 mm. reference numerals 19, 20, 21 designate various bevels of the support element 3.

Figure 4:
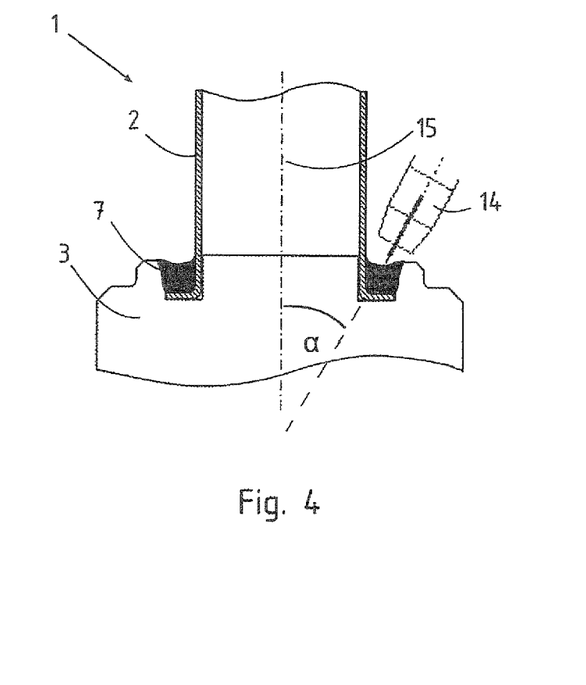
FIG. 4 is a schematic illustration of a welding torch in an angular disposition relative to a joining seam to be realized.

FIG. 4 shows hybrid part 1 according to the invention during manufacture thereof. The joining seam 7 between the hollow section 2 and the structural element 3 is provided by a welding torch 14. The welding torch 14 is arranged at an angle α between 20° and 50° in relation to the longitudinal axis 15 of the hollow section 2.

Figure 5:
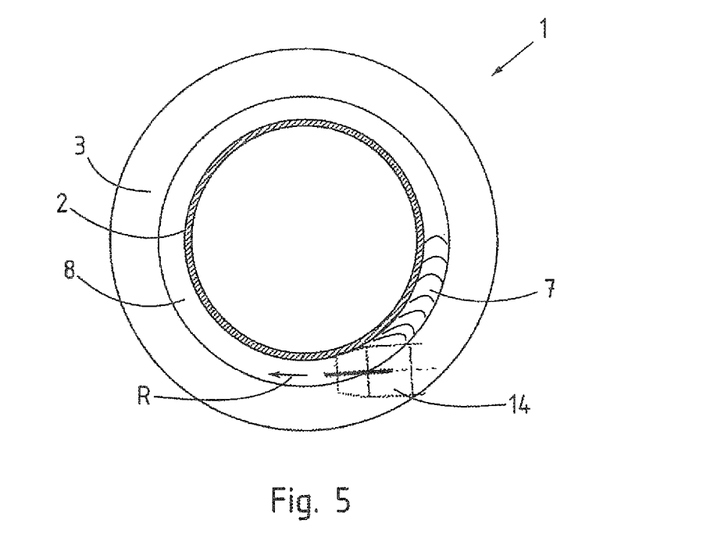
FIG. 5 is a schematic illustration of a welding torch in a welding position according to the present invention.

FIG. 5 shows hybrid part 1 according to the invention during manufacture in accordance with the present invention. The hollow section 2 is again arranged above the structural element 3. The welding movement is implemented in the welding position PA in a piercing manner in the joining zone 8 for making the joining seam 7. In other words, the welding torch 14 is moved in a piercing manner in relation to the joining seam 7 to be realized. The welding torch 14 is also moved in welding direction SR, with the joining seam 7 being realized behind the welding torch 14.

Figure 6:
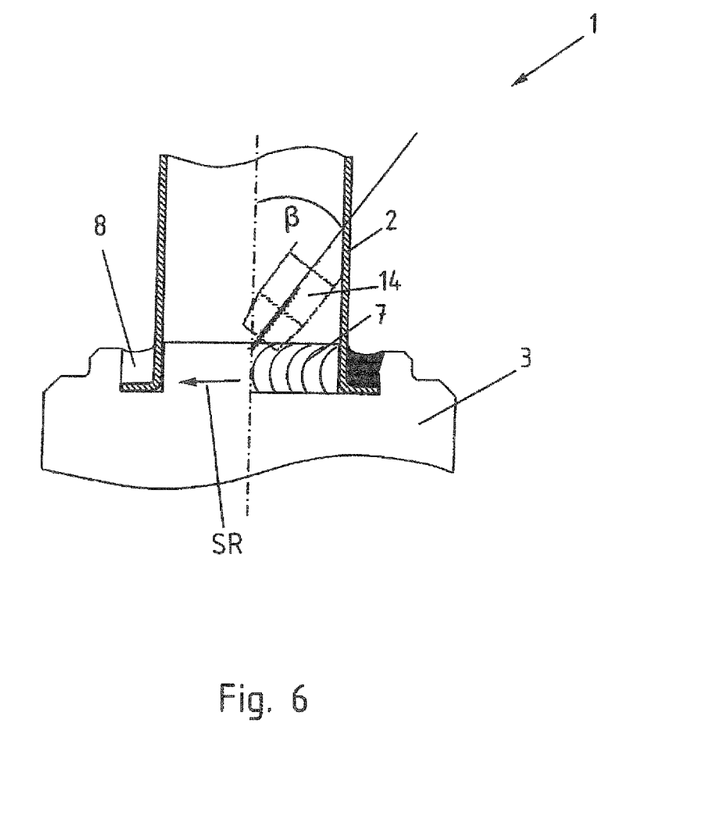
FIG. 6 is a schematic illustration of a welding torch in the welding position and piercing welding motion.

FIG. 6 shows hybrid part 1 according to the invention during manufacture thereof. As sown in a greatly simplified manner, the welding torch 14 produces a joining seam 7 around the hollow section 2 and the structural element 3. The welding torch 14 orbits hereby in welding direction SR about the joining zone 8 and assumes an angular position at an angle β between 20° and 40° in relation to the longitudinal axis 15 during welding movement in a piercing manner.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A method of producing a material joint between a hollow section of steel and a structural element of an aluminum material different from the steel, said method comprising the steps of:
    aligning the hollow steel section in relation to the structural element of aluminum material in a coupling position;
    placing one end of the hollow steel section upon a shoulder of the structural element; and
    thermal joining of the end of the hollow steel section with the structural element using inert gas shielded arc welding by positioning a welding torch in tangential direction to a circumference of the hollow steel section at an angle of 20° to 40° to a longitudinal axis of the hollow steel section and orienting the welding torch radially outwards at an angle of 20° to 50° relative to the longitudinal axis of the steel hollow section, thereby producing a material joint sufficient to join the hollow steel section with the structural element of aluminum material.

2. The method of claim 1, wherein the inert gas includes argon and helium as constituents.

3. The method of claim 1, wherein the welding torch is fixed, and the hollow section and the structural element move in relation to the welding torch.

4. The method of claim 1, wherein the inert gas shielded arc welding is executed at a weld speed between 9 and 16 mm/s.

5. The method of claim 1, wherein the thermal joining step includes adding weld metal at a wire advance speed between 7 and 10 m/min.

6. The method of claim 1, further comprising providing in addition to the thermal joining step a formfit between the structural element and the hollow section, with the joining seam engaging behind the end of the hollow section.

7. The method of claim 1, wherein the thermal joining step is executed with a pulsed MIG (metal inert gas) welding process.

8. The method of claim 1, wherein the structural element is configured as cast aluminum body or milled aluminum body, with the structural element being machined before being pressed in a reception zone for the hollow section.

9. The method of claim 1, further comprising pressing the hollow section onto a receiving pin of the structural element to thereby provide an interference fit between the structural element and the hollow section.

10. The method of claim 1, wherein the thermal joining step is executed in several layers, further comprising mechanical, physical and/or chemical cleaning between application of individual layers during the thermal joining step.

11. The method of claim 2, wherein the inert gas includes 70 wt-% of argon and 30 wt-% of helium.

12. The method of claim 5, wherein the weld metal includes aluminum.

13. The method of claim 9, wherein the receiving pin has a beveled free end and a reception zone at a length between 8 mm and 60 mm.

14. The method of claim 9, wherein the structural element has a depression in the shape of a trough to extend about the receiving pin for receiving a formed region of the hollow section, with the depression having a curvature on both sides of a bottom zone.

15. The method of claim 9, wherein the hollow section is formed and/or calibrated before being pressed with the end upon the receiving pin.

16. The method of claim 13, wherein the free end of the receiving pin is beveled at an chamfer angle ranging between 20° and 60°.

17. The method of claim 14, wherein the curvature of the depression has a radius between 1 and 18 mm.

18. The method of claim 14, wherein the depression is delimited by the receiving pin on an inner side and by a receiving bead on an outer side.

19. The method of claim 18, wherein the receiving bead is defined by a height between 3 mm and 10 mm.

20. The method of claim 18, wherein the receiving bead extends at a side facing the receiving pin at an angle to a longitudinal axis of the receiving pin.

21. The method of claim 20, wherein the angle of the receiving bead in relation to the receiving pin ranges between 20° and 60°.

22. The method of claim 15, wherein the end has an inner side defined by a radius which corresponds to a radius of a bottom zone on the inner side of a through-shaped depression of the structural element.

23. The method of claim 15, further comprising debarring an outer side of the hollow section at the end of the hollow section.

* * * * *